March 31, 1970 R. L. EASTON 3,504,367
METHOD OF RANGING COMPATIBLE WITH SPACE SURVEILLANCE SYSTEM
Filed Feb. 28, 1963 3 Sheets-Sheet 1

INVENTOR.
ROGER L. EASTON
ATTORNEY

March 31, 1970   R. L. EASTON   3,504,367
METHOD OF RANGING COMPATIBLE WITH SPACE SURVEILLANCE SYSTEM
Filed Feb. 28, 1963   3 Sheets-Sheet 3
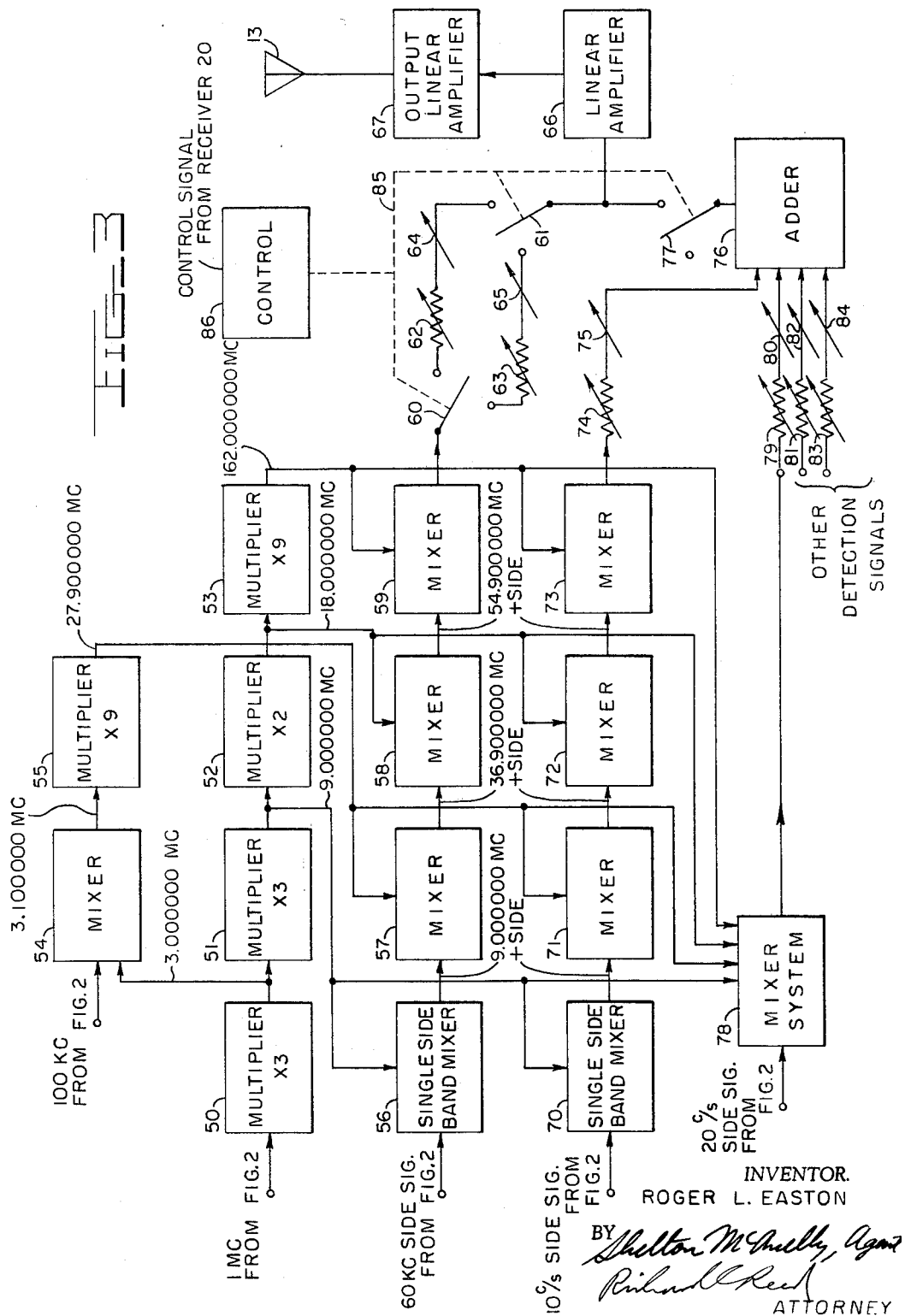
INVENTOR.
ROGER L. EASTON
ATTORNEY

United States Patent Office 3,504,367
Patented Mar. 31, 1970

3,504,367
METHOD OF RANGING COMPATIBLE WITH SPACE SURVEILLANCE SYSTEM
Roger L. Easton, Oxon Hill, Md., assignor to the United States of America as represented by the Secretary of the Navy
Filed Feb. 28, 1963, Ser. No. 261,907
Int. Cl. G01s 9/04
U.S. Cl. 343—12                                       3 Claims The invention described herein may be manufactured and used by or for the Government of the United States of America for governmental purposes without the payment of any royalties thereon or therefor.

This invention relates to object detection systems in general and in particular to systems for detecting objects in orbit around the earth in which range information is obtained with only two apparatus locations rather than the three apparatus locations required by the prior art.

At first glance, the problem of deriving range information with satellite detection apparatus seems a rather simple matter particularly since accurate range determination from even a single apparatus location was well known from the early days of radar. Satellite detection is unique, however, because of the relatively small size of the objects involved, their great distances from the earth, their high "linear" velocities or angular rates, and the desirability of maintaining continuous (angular and time) horizon to horizon sensitivity in one plane. Thus conventional radar techniques for accurate position determination at long ranges, based primarily on narrow beam antennas and pulse echo operation, are virtually useless for satellite detection because of the inherently small instantaneous coverage which coverage is necessarily intermittent for any particular direction because of the necessity for sweeping of the narrow beam which is the conventional basis of covering large areas with directive beam techniques. A different technique has evolved based on interferometer principles and using large antennas such as mile long fixed arrays to provide fan shaped beams with high antenna gain. Such interferometer systems require a minimum of three installations, one transmitter and two receivers, located approximately on a great circle substantially transverse to the expected plane of satellite travel with installations spaced on the order of several hundreds of miles.

Such installations can be made where there are large continental areas available or where islands happen to be located conveniently, however, there are vast areas of the surface of the earth where the installation of detection apparatus is desirable that do not provide the required three convenient land masses located on a desired great circle. Many such areas do provide two conveniently located land masses and it is thus desired to provide a system in which the required location characteristics including ranging can be obtained with fewer than the conventional three installations.

It is accordingly an object of the above invention to provide a satellite detection and location system which provides range sensitivity as well as angular sensitivity.

Another object of the present invention is to provide a satellite detection and location system which provides continuous wide angle coverage and which requires less than three apparatus stations.

Another object of the present invention is to provide a satellite detection and location system in which a plurality of signals are transmitted at different frequencies with phase shift of return signals providing the basis of determining range of a distant signal return object.

Other objects, and many of the attendent advantages of this invention will be readily appreciated as the same becomes better understood by reference to the following detailed description when considered in connection with the accompanying drawings wherein:

FIG. 3 shows additional details of the coordinated radio frequency generator portion of the transmitter apparatus of FIG. 1.

Figure 1:
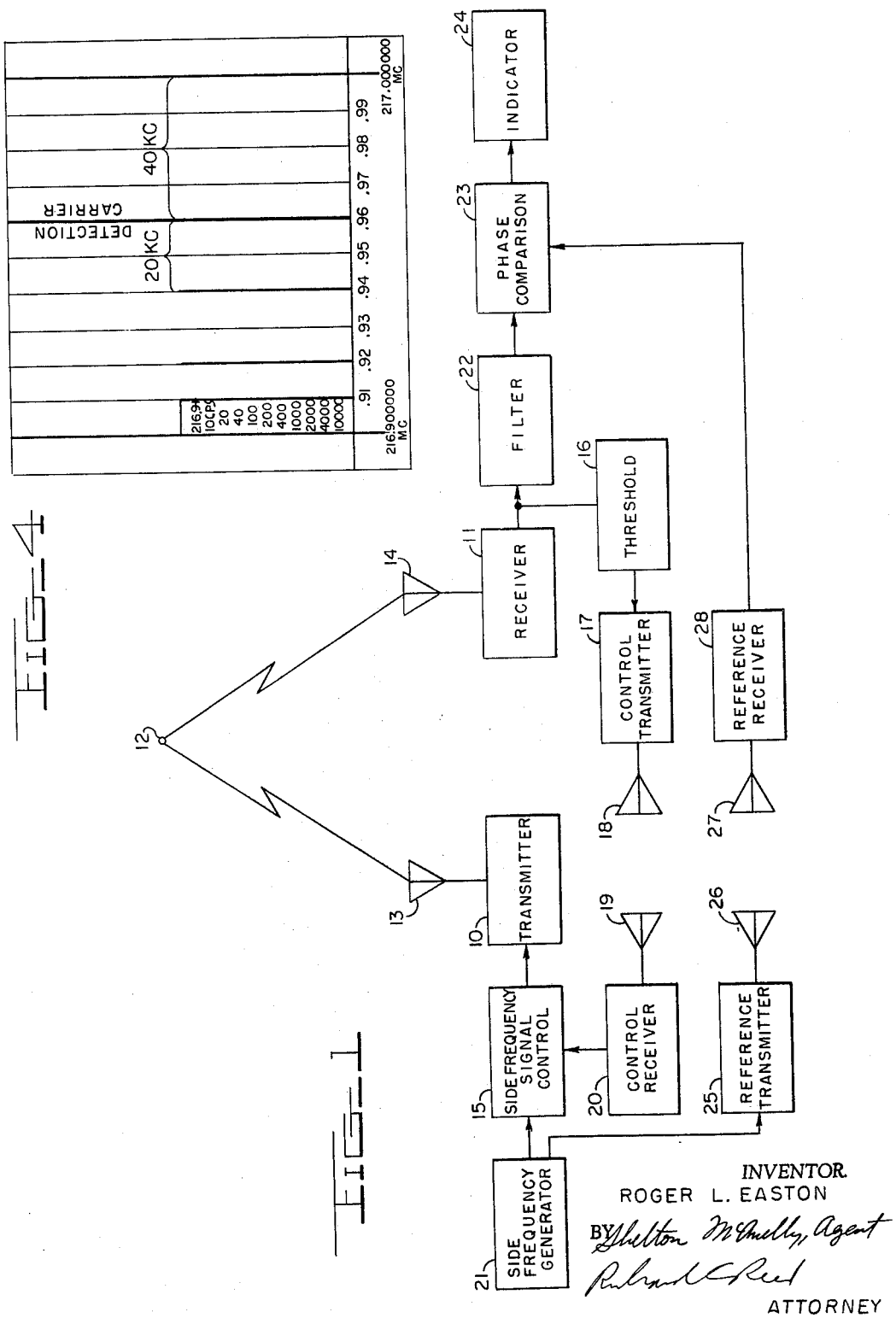
FIG. 1 shows a block diagram of typical apparatus constructed in accordance with the teachings of the present invention.

FIG. 4 indicates in general a typical radio frequency spectrum employed in an exemplary embodiment of the features of the present invention.

In accordance with the basic teaching of the present invention, a detector and locator system for earth satellites and like objects in space is provided which possesses the broad angular sensitivity of the interferometer type of satellite detection system and adds to it range determination capability at each receiver location. This capability provides a substantial reduction in the apparatus locations required for locating an object in space. Thus it is possible to combine the already well-known signal arrival angle determination capabilities of a single interferometer type receiving station with the new range determination capabilities to simplify the long existing problem of effectively determining the location of objects in space from a single receiver site rather than the plural receiving sites required by the prior art.

The distance determining capabilities of the apparatus in the present invention are based upon the introduction of measurable differential phase shift between various frequency components of a multifrequency emitted signal in transit to and from a distant energy return object. The amount of such differential phase shift is dependent upon the distance traversed by the transmitter energy in its path to the object and back to the receiver. Long range capabilities are provided by using signals which are closely related in frequency so as to have a differential "wavelength" of several thousand of miles per differential cycle whereas more precise range is obtained by using signals which have a higher differential in frequency so as to have shorter differential "wavelength." The foregoing basic concept is expanded considerably in producing an overall system by employing a keying on and off of the multiple frequency signal emission to provide enhanced signal to noise ratio with a single radio frequency for the initial detection of the presence of a distance energy return object following which the multiple frequencies are emitted for range determination. The need for this is brought about because of the fact that when a plurality of different frequency signals are combined for transmission, the receiving bandwidth is wider than is required for a single transmitted frequency, resulting in an undesirably low average signal to noise ratio. Thus the operation of the system for mere search purposes when there is no known object present whose range is to be determined is basically that of the emission of a single unmodulated carrier wave having a large amplitude at all times and requiring a minimum bandwidth.

A further aspect of the combination of a plurality of signals of different frequencies for transmission and the fact that there will be times at which all signals will be in phase and hence additive is the undesirably large peak power requirements placed upon the associated transmitter signal handling apparatus even with low average power. To minimize this difficulty, another aspect of the present invention is to improve upon this situation by deriving all of the individual signals required from a single source so that a precise relative phasing of the components at radio frequency providing a minimum ratio of peak to average power can be established and maintained. Thus, the apparatus further evolves as a system in which careful control of the phasing and amplitude of the individual signals is required and achieved.

FIG. 1 shows apparatus associated with a transmitter 10 and receiver 11 for detecting the position of a distant object which may be called an earth satellite to characterize an object of small size at long range and identified by the reference character 12. Typically the apparatus associated with the transmitter 10 would be at one location on the surface of the earth while that associated with the receiver 11 would be placed at another location on the surface of the earth at some distance from the transmitter location so as to substantially avoid direct coupling between the transmitter 10 and the receiver 11.

Transmitter 10 and receiver 11 together with their antennas 13 and 14 are components of conventional interferometer type systems such as the Navy Space Surveillance System described in the Nov. 26, 1962 issue of Aviation Week & Space Technology in an article by Philip J. Klass titled "Spasur Net Giving Vital Norad Coverage." In these systems, it is the function of the receiver 11 to determine the direction of the distant energy reflective object 12 without requiring angular scanning techniques which reduce the desired continuous broadbeam detection capabilities. Unfortunately such broad beam capabilities which are required of conventional installations of this type do not simultaneously have ranging capabilities with a single receiver familiar to pulse echo radar systems because even momentary interruption of the angular detection capability is not permissible.

The antennas 13 and 14 have a broad fan-shaped beam or response pattern in one plane which preferably is located orthogonally relative to the expected path of travel of objects 12, and in addition have a narrow beam in the orthogonal plane of the path of travel of the object 12. Thus the antenna beam is of the nature of a "fence" for the detection of crossing objects. Although the broad dimension of the beam preferably stretches from horizon to horizon, the narrow dimension of the beam is normally so small that orbiting object will be within the beam for at most a few seconds. It is readily seen therefore that the device of the present invention is expected to have very unusual detection capabilities in that it must be sensitive from horizon to horizon in one plane out to distances of tens of thousands of miles or more, and yet must be able to locate any object from horizon to horizon, not merely as to angular direction but also as to range and accomplish all of this in the short time available. Such requirements clearly rule out any scanning techniques and require continuous operation of the transmitter 10 together with continuous sensitivity of receiver 11.

The transmitter 10 of FIG. 1, is provided with the radio frequency signals to be transmitted by the side frequency signal control 15. Side frequency signal control 15 is primarily for the purpose of causing substantially continuous wave operation of the transmitter 10 at a single typical frequency of 216.96 megacycles per second in all periods except when it is known that an energy reflective object 12 is in a position to produce the return of transmitter energy to the receiver 11. When the presence of the energy return object 12 is detected by receiver 11, the side frequency signal control device 15 is caused to provide transmitter 10 with a plurality of additional drive signals of different frequencies from that of the basic carrier wave for ranging purposes. The desired sensing for the side frequency signal control device 15 is typically provided by the receiver 11 itself by means of a communication link including signal amplitude sensing threshold device 16, control transmitter 17, antennas 18 and 19, and control receiver 20. These components 16 through 20 sense the presence of output from receiver 11 resultant to an object 12 emit a control signal from antenna 18 which is received by antenna 19, suitably amplified in receiver 20 and applied to the side frequency signal control device 15 to produce the previously described control of emission by the basic transmitter 10. It is to be understood that under certain condition of separation of the transmitter and receiver devices that it may not be possible or desirable to use radio frequency transmission between antennas 18 and 19 in which case it may be considered desirable to substitute other forms of linkage such as a direct wire linkage between the threshold device 16 and the side frequency signal control 15. Such is of course a matter of choice and the equivalency of such arrangements for the purposes of the present invention is well known in the art.

The side frequency signal control device 15 is typically a switching arrangement together with a plurality of attenuator and phase shift control devices by means of which it is possible to control the relative amplitude and phasing at radio frequency of the various signals delivered to the transmitter 10 for emission by antenna 13.

The side frequency signal control device 15 is provided with the signals of the various desired frequencies by the side frequency generator 21 which derives the various frequencies involved from a single master oscillator so that a desired phase relationship between the various signals when once established can be maintained at all times.

To proceed to a discussion of the receiver station, signals received by the antenna 14 by reflection from the object 12 are suitably amplified in the receiver 11 and delivered to filter 22 in which the various components are separated. Filter 22 is connected to phase comparison device 23 which is typically a plurality of phase meters of conventional structure intended to determine the relative phasing between the various signals. Each phase meter provides an output to indicator 24 which can be merely a suitable device to indicate individually the output of the phase meters or which may have some form of coordinated presentation by means of a single indicator of the total amount of unambiguous differential phase shift of the two signals having the largest frequency differential. Those signals from filter 22 which are closest in frequency will experience less differential phase shifts during the transit from transmitter 10 to object 12 and back to receiver 11 than those signals which are further apart in frequency. The signals further apart in frequency together with their greater phase shift provide greater accuracy in determining the position of an object within a differential wavelength, however, phase comparison devices are ambiguous in that they repeat every 360° as to their indication so that the longer differential wavelength of the closely spaced frequencies is required to resolve the repetitive cycle ambiguity of the wide frequency-spaced signals. It has been found advantageous to transmit signals at the following typical frequencies (megacycles per second)

```
216.900010
216.900020
216.900040
216.900100
216.900200
216.900400
216.901000
216.902000
216.904000
216.910000
216.920000
216.940000
216.960000 (DETECTION CARRIER)
```

The foregoing frequency arrangement is indicated in general in FIG. 4 for a typical frequency band from 216.900000 mc. per second to 217.000000 mc. per second. The lowest difference frequency of 10 cycles per second provides a full scale unambiguous time delay measurement for 360° differential phase shift of 100 milliseconds corresponding to 18,600 miles range.

For higher frequencies the one cycle differential delay measurement is less, for example, for 100 cycles per second difference, the delay is 1,860 miles, whereas for a 1,000 cycles per second difference it is 186 miles, for a 10 kilocycles difference 18.6 miles, and so on. Thus by observing or measuring the various phase shift indications of the different frequencies it is possible to avoid the ambiguity of multiple cycle differential phase shift to obtain a readily usable and accurate range indication.

It will be recalled that mention was made of the fact that an object 12 passing overhead normally is in detection or ranging position for only about one second. Actually this is optimistic because of the fact that at maximum range, detection does not occur until the peak of the beam is reached and ranging is likewise limited to such a zenith position as far as the horizon to horizon plane of sensitivity is concerned. It is obvious that to read a plurality of continuous phase shift indicators in such a brief time is quite difficult. Thus some form of aided interpretation such as recording the signals involved under the control of the threshold 16 or some other arrangement for causing all of the base indications to be derived at the same instant and retained for subsequent reading is desired. Arrangements for such purposes are of course well known in the art and there is no present need to describe suitable devices in greater detail.

The utility of the apparatus of FIG. 1 can be extended with reference transmitter 25, antenna 26, antenna 27 and reference receiver 28 which are intended to supply reference signals from the side frequency generator 21 to phase comparison 23 for calibration or other purposes at the receiver location. It is observed that a radio frequency link is also used in this instance between the antennas 26 and 27, however, as with the control signal linkage, it is to be understood that under certain conditions it may be more desirable to use other forms such as a wire link.

Figure 2:
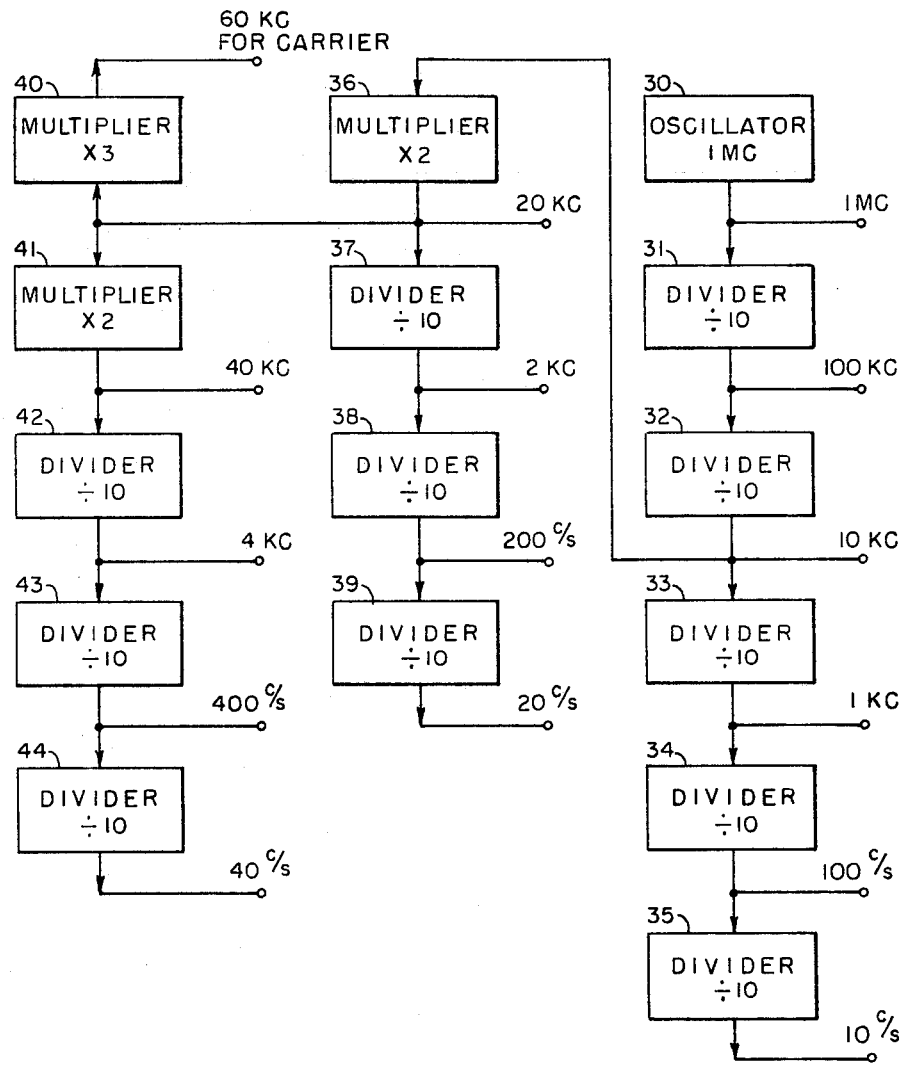
FIG. 2 shows details of a synchronized multifrequency signal generator for the transmitter apparatus of FIG. 1.

With reference now to FIG. 2 in the drawing, apparatus is shown therein for deriving the basic phase related signals required for the operation of transmitter 10.

The basic component of FIG. 2 is an oscillator 30 which is typically operative at a frequency of 1 megacycle per second. This oscillator is designed and operated in such manner as to achieve an extremely high stability.

The oscillator 30 is employed in the first instance to drive tandem frequency dividers each operative by a factor of 10 and indicated by the reference characters 31, 32, 33, 34 and 35. As a result of these five frequency dividers it is possible to obtain phase coordinated "one" signals at frequencies of 100 kilocycles, 10 kilocycles, 1 kilocycle, 100 cycles and 10 cycles, all per second.

The apparatus of FIG. 2 includes frequency multipliers and additional frequency dividers which for convenience are driven from the 10 kilocycle output of divider 32. A first manipulation of the 10 kc. signal is performed by factor of two multiplier 36 to obtain a 20 kc. signal. Multiplier 36 is followed by three factor of ten frequency dividers identified by the reference characters 37, 38 and 39. As a result of these components 36 through 39 phase 1 locked "two" signals having frequencies of 20 kc., 2 kc., 200 cycles and 20 cycles, all per second, are obtained.

The 20 kc. signal from multiplier 36 is also supplied to factor of three frequency multiplier 40 which produces a 60 kc. signal which when mixed with the basic channel frequency of 216.900000 in a single side band mixer 56 (FIG. 3) provides the detection carrier frequency of 216.960000 megacycles per second.

The 20 kc. signal from multiplier 36 is also delivered to a factor of two multiplier 41 to obtain a 40 kc. per second signal. This in turn is followed by three factors of 10 frequency dividers 42, 43, and 44. The "four" signals are thus obtained at 40 kc., 4 kc., 400 cycles and 40 cycles, all per second.

With reference now to FIG. 3 of the drawing, the one megacycle signal and the 100 kilocycle signal from FIG. 2 are employed with mixers and multipliers to derive another group of phase locked signals for general utility for transmitter 10. The one megacycle signal is applied to factor of three multiplier 50 to derive a 3 megacycle signal. Multiplier 50 is followed by factor of three multiplier 51 to obtain a 9 megacycle signal. In turn multiplier 51 is followed by factor of two multiplier 52 to derive an 18 megacycle signal.

Multiplier 52 is followed by factor of nine multiplier 53 which provides a 162 megacycle per second signal.

The 3 megacycle per second signal from multiplier 50 is applied to mixer 54 which also receives the 100 kc. per second signal of FIG. 2 and which produces a 3.1 megacycle per second output. Mixer 54 is followed by factor of nine multiplier 55 which produces a 27.9 megacycle per second signal. The basic signals of 9 megacycles, 27.9 megacycles, 18 megacycles and 162 megacycles per second are applied to a series of mixers to derive signals at 216.9 megacycles per second plus each of the side frequency outputs of FIG. 2.

To take the detection carrier frequency first for example, the 60 kc. signal from FIG. 2 is applied to single sideband mixer 56 which mixer also receives the 9 megacycle signal from multiplier 51 to produce a 9.060000 megacycle per second signal. This signal is applied to mixer 57 which also receives the 27.9 megacycle per second signal from multiplier 55 to provide a 36.960000 megacycle signal. In turn mixer 57 is followed by mixer 58 which receives also the 18 megacycle per second signal from multiplier 52 to provide a 54.960000 megacycle signal. Mixer 58 in turn is followed by mixer 59, which also receives the 162 megacycle per second from multiplier 53 to provide the basic detection carrier signal of 216.960000 megacycles per second.

The output of mixer 59 is applied through switches 60 and 61, attenuators 62, 63, and phase shifters 64 and 65 to linear amplifier 66 and output amplifier 67 for radiation by antenna 13. With the switches 60 and 61 in one position, mixer 59 is connected to linear amplifier 66 through attenuator 62 and phase shifter 64. With the switches 60 and 61 in the opposite position, however, the linear amplifier 66 is driven from mixer 59 through a different attenuator 63 and phase shifter 65 so that different drive characteristics can be obtained. The reason for this is that normally in the detect condition, only the carrier output signal of 216.960000 megacycles per second is emitted and it is desiredly emitted so as to drive the output amplifier 67 to its full desired output. This would give the highest possible signal to noise ratio for detection purposes. A different situation prevails, however, when it is desired to transmit the multiple frequency signals for ranging purposes in that with the additional signals to be transmitted it is necessary to reduce the amplitude of the carrier signal to prevent over driving the amplifiers 66 and 67 or exceeding the capabilities of the antenna 13 and its connecting lines. For this reason then, the attenuator 63 would be provided. The phase shifter 65 is also provided so that control over the relative phasing of the carrier as well as the other signals emitted for ranging can be obtained to minimize the peaks where the various modulation signals are additive in phase as far as is possible. Normally there would be little need for the phase shifter 64 in the straight through "detect" path because the phasing of the single detection carrier is not critical but it is indicated in this instance for convenience and uniformity of all the signal paths.

A first side frequency to be transmitted for ranging purposes as previously mentioned will be 216.900010 megacycles per second. This particular signal is obtained as typical of all of the modulation frequencies with the apparatus of signal sideband mixer 70, and mixers 71, 72 and 73. These components correspond to the similarly termed components 56, 57, 58, 59 for the carrier signal and are provided with the same basic signals except for the input signal to the signal sideband mixer 70 from the apparatus of FIG. 2 which in this case will be the ten cycle per second signal obtained from the output of divider 35. The result with this 10 cycle per second signal applied to the chain of mixers 70 through 73 is the production by output mixer 73 of a signal at the frequency of 216.900010 megacycles per second. This signal is delivered through attenuator 74 and phase shifter 75 to adder 76 whereby it is applied to the appropriate position of switch 77 to the linear amplifier 66 for transmission.

Similar arrangements are made for the other side frequency signals previously identified as 216.9000020 and so forth. For example, the production of the 216.9000020 signal is indicated simply as being performed by a mixer system 78 which contains components such as all of the components 70, 71, 72 and 73 for the 216.900010 signal execept it is supplied with the 20 cycle per second side frequency signal from FIG. 2 and is connected through attenuator 79 and phase shifter 80 to the adder 76. The mixing arrangement for the balance of the ranging frequencies is not shown being indicated in general as other detection signals being supplied, for example, through attenuator 81 and phase shifter 82 for one component and attenuator 83 and phase shifter 84 for another, and so forth.

The switches 60, 61 and 77 are preferably ganged and operated by some suitable mechanical arrangement indicated in general by the dotted connections 85 from control device 86 which receives the control signals from the control receiver 20 of FIG. 1.

In summary, then of details of FIGS. 2 and 3 as they are contained in the basic components of FIG. 1, the side frequency generator 21 is made up of the apparatus of FIG. 2 together with the mixer and multiplier portions of FIG. 3. The side frequency signal control 15 of FIG. 1 is made up of the control 86, the switches 60, 61, 77 and the various attenuators and phasing devices of FIG. 3 connected to the switches. The transmitter 10 of FIG. 1 is shown in slight additional detail in FIG. 3 as being made of the linear amplifier 66 and the output linear amplifier 67. Such linear amplifiers are of course now well known in the art.

Comprehension of the relationship of the various signals may be facilitated by reference to FIG. 4. In this particular representation, indication is made of a detection carrier at a typical frequency of 216.960000 megacycles per second which occurs approximately 40 kc. below the upper limit of an assigned band of frequencies which is 217.000000 megacycles per second. This leeway is provided to insure adequate accommodation for Doppler frequency shifts. Below this carrier frequency of 216.960000 megacycles per second are placed the side of "ranging" frequencies approaching the lower limit of the band at 216.900000 megacycles. The lower limit can be closer to the end of the band because ranging normally takes place near the zenith where Doppler is a lesser consideration and at a subsequent period in time from that of detection so that the receiver can effect automatic frequency control to minimize Doppler. Such automatic frequency control is of course well known in the art. Each of the ranging frequencies is displaced upward from the lower limit of 216.900000 by the actual amount of the basic side frequency produced by the apparatus of FIG. 2 used in its production by the apparatus of FIG. 3. For example, the 10 cycles per second signal produced by the output of divider 35 appears as a 216.900000 plus 10 cycle per second signal, or 216.900010 megacycles. Actually the smallest difference in phase between two signals, say the 216.900010 and the 216.9000020 megacycles per second signal, is 10 cycles per second and it is on this basis that the 360° differential unambiguous phase shift potential of 18,600 miles is obtained. Progressing upward, the frequency difference between 216.9000020 and 216.9000040 is 20 cycles per second so that the 360° unambiguous differential phase shift range is exactly half that of the 10 cycle per second signal.

From the foregoing, it will be apparent that the invention is intended to be operated as part of a previously known detection system, such as the Navy Space Surveillance System. These systems are capable of determining, by well known and previously publicized interferometer techniques, the direction of a satellite relative to a receiver station during the second or so that the satellite is passing through the narrow detection plane, or fence, of the system. This plane is generally perpendicular to the direction of travel of the satellite. Until the satellite enters the narrow detection plane and is detected, the system radiates a continuous wave signal at a frequency of 216.960000 megacycles. Upon detection of the satellite, and according to this invention, the multifrequency ranging signals are also transmitted. These ranging signals are utilized to determine the distance travelled from transmitter to receiver by the energy reflected from the satellite. This ranging information, which provides an elliptical locus of possible satellite locations, when evaluated together with the directional information obtained by the conventional interferometer techniques, permits a precise determination of the position of the satellite when it crossed the narrow detection zone of the detection system.

Obviously many modifications and variations of the present invention are possible in the light of the above teachings. For example, separate transmitters and antennas could be provided for the side frequencies, in which case, or even without, it may be desirable to transmit the side frequencies continuously together with the detection frequency. Additionally, lower differential side frequencies can be used to extend the unambiguous range. It is therefore to be understood that within the scope of the appended claims the invention may be practiced otherwise than as specifically described.

What is claimed is:
1. In combination,
   a signal emission system for continuously emitting energy at a basic frequency, and upon application of a control signal, energy at a plurality of discrete frequencies wherein some frequencies are closer together than others,
   means for receiving emitted energy reflected by a distant energy return object whose range is to be determined,
   control signal derivation means connected to said means and to said signal emission system for activating the plural frequency operation of said signal emission system upon receipt of a return signal by the means, and
   phase shift measuring means connected to said means for receiving for determining the differential phase shift of the reflected energy responsive to the discrete frequencies, whereby the range of the energy return object is determined with accuracy provided by the differential phase shift in transit of widely separated frequencies, and multiple cycle ambiguity elimination provided by the differential phase shift in transit of closer spaced frequencies.
2. In combination,
   a transmitter station for producing an electromagnetic wave energy field in space,
   a master oscillator,
   frequency alteration means locked to said master oscillator for producing a plurality of phase locked radio frequency signals wherein some signals are closer together in frequency than other signals,
   means for driving said transmitter station with the phase locked signals, means for receiving transmitter energy reflected by a distant energy return object whose range is to be determined, control signal derivation means connected to said means for receiving and to said frequency alteration means for driving said transmitter with a single frequency signal in normal operation and with the plural phase locked signals upon receipt of return signals by said means for receiving, and phase shift measuring means connected to said means for receiving for determining the differential phase shift of the reflected energy responsive to the discrete frequencies, whereby the range of the energy return object is determined with accuracy provided by the differential phase shift in transit of the widely separated frequencies, and multiple cycle ambiguity elimination provided by the differential phase shift in transit of the closer spaced frequencies.

3. A satellite detection system comprising:

transmitter means for continuously emitting energy at a basic frequency into a narrow detection zone intended to be perpendicular to the direction of travel of a satellite and, upon application of a control signal, for emitting energy into said zone at a plurality of discrete frequencies wherein some frequencies are closer together than others;

receiver means for receiving energy reflected by a satellite in said detection zone and including interferometer means operable by reflected energy of said basic frequency for determining the relative direction of said satellite;

control signal producing means operatively coupled to both said transmitter and receiver means and responsive to said basic frequency reflected energy received by said receiver means for applying a control signal to said transmitter means to cause said transmitter means to emit energy at said plurality of discrete frequencies, and phase comparison means, operatively coupled to both said transmitter and receiver means, for comparing the phase of transmitted energy and energy received by said receiver means and, when energized by signals at said plurality of discrete frequencies, for supplying information regarding the range of said satellite, whereby the location of said satellite detection is ascertainable by the evaluation of said range information and said interferometer means direction determination.

References Cited

UNITED STATES PATENTS

| | | | |
|---|---|---|---|
| 3,122,741 | 2/1964 | Easton | 343—100 |
| 3,112,484 | 11/1963 | McKeown | 343—112 |
| 2,639,422 | 5/1953 | Harris | 343—112 |
| 2,248,727 | 7/1941 | Strobel | 343—12 |

OTHER REFERENCES

Menzel, "Tracking the Earth Satellite, and Data Transmission by Radio," Proceedings of the IRE, June 1956, 343–117A.

RICHARD A. FARLEY, Primary Examiner

J. P. MORRIS, Assistant Examiner